(12) United States Patent
Fuehrer et al.

(10) Patent No.: US 7,912,210 B2
(45) Date of Patent: Mar. 22, 2011

(54) INDUCTIVE COUPLING FOR COMMUNICATIONS EQUIPMENT INTERFACE CIRCUITRY

(75) Inventors: Timothy W. Fuehrer, Easton, PA (US); Donald R. Laturell, Allentown, PA (US); Lane A. Smith, Easton, PA (US); Christopher J. Wittensoldner, Alburtis, PA (US)

(73) Assignee: Agere Systems Inc., Allentown, PA (US)

( * ) Notice: Subject to any disclaimer, the term of this patent is extended or adjusted under 35 U.S.C. 154(b) by 378 days.

(21) Appl. No.: 12/187,456

(22) Filed: Aug. 7, 2008

(65) Prior Publication Data

US 2009/0028320 A1    Jan. 29, 2009

Related U.S. Application Data

(63) Continuation of application No. 09/723,451, filed on Nov. 28, 2000, now abandoned, which is a continuation-in-part of application No. 09/605,953, filed on Jun. 28, 2000, now Pat. No. 7,113,587.

(51) Int. Cl.
*H04M 1/00* (2006.01)
(52) U.S. Cl. .............. 379/399.01; 379/399.02; 379/402; 379/412; 379/413
(58) Field of Classification Search .............. 379/377, 379/398, 399.01, 399.02, 402, 412, 413, 379/387.02
See application file for complete search history.

(56) References Cited

U.S. PATENT DOCUMENTS

| | | | |
|---|---|---|---|
| 4,401,955 A | 8/1983 | Yorinks et al. | 333/127 |
| 4,803,719 A | 2/1989 | Ulrich | 379/399.01 |
| 4,852,080 A | 7/1989 | Ohtake et al. | 370/295 |
| 5,255,094 A | 10/1993 | Yong et al. | 348/632 |
| 5,311,086 A | 5/1994 | Yamaji et al. | 327/356 |
| 5,369,666 A * | 11/1994 | Folwell et al. | 375/222 |
| 5,515,433 A | 5/1996 | Chen | 379/398 |
| 5,646,558 A | 7/1997 | Jamshidi | 326/106 |
| 5,832,076 A | 11/1998 | Holthaus et al. | 379/387.02 |
| 5,864,580 A | 1/1999 | Lowe et al. | 375/222 |
| 6,008,681 A | 12/1999 | Beutler et al. | 327/304 |
| 6,067,316 A | 5/2000 | Amrany et al. | 375/220 |
| 6,081,586 A | 6/2000 | Rahamim et al. | 379/93.29 |
| 6,094,659 A * | 7/2000 | Bhatia | 375/222 |
| 6,137,392 A | 10/2000 | Herbert | 336/175 |
| 6,160,885 A | 12/2000 | Scott et al. | 379/399.01 |
| 6,167,121 A * | 12/2000 | Arai | 379/93.05 |
| 6,169,762 B1 | 1/2001 | Embree et al. | 375/220 |
| 6,212,263 B1 | 4/2001 | Sun et al. | 379/93.28 |
| 6,385,315 B1 | 5/2002 | Viadella et al. | 379/88.23 |
| 6,389,134 B1 | 5/2002 | Dupuis et al. | 379/373.01 |
| 6,404,780 B1 | 6/2002 | Laturell et al. | 370/510 |
| 6,483,904 B1 | 11/2002 | Yucebay | 379/93.02 |
| 6,553,216 B1 | 4/2003 | Pugel et al. | 455/340 |
| 6,567,520 B1 | 5/2003 | Murphy et al. | 379/377 |
| 6,819,710 B1 | 11/2004 | Dupuis | 375/222 |
| 2001/0036261 A1 | 11/2001 | Prendergast et al. | 379/398 |

* cited by examiner

*Primary Examiner* — Tuan A Pham
(74) *Attorney, Agent, or Firm* — Mendelsohn, Drucker & Associates, P.C.; Steve Mendelsohn

(57) ABSTRACT

A system for improving the attenuation of an undesired signal found in a differential signal path through the use of inductive coupling. The system includes a primary inductor, a secondary inductor, and a filter. The primary inductor and the secondary inductor operably couple an input differential signal pair to an output differential signal pair, and the filter attenuates an undesired signal in the output differential signal pair.

22 Claims, 3 Drawing Sheets

INDUCTIVE COUPLING FOR COMMUNICATIONS EQUIPMENT INTERFACE CIRCUITRY

REFERENCE TO RELATED APPLICATIONS

This application is a continuation of co-pending U.S. patent application Ser. No. 09/723,451 filed on Nov. 28, 2000, which is a continuation-in-part of U.S. patent application Ser. No. 09/605,953 filed on Jun. 28, 2000 and issued as U.S. Pat. No. 7,113,587 on Sep. 26, 2006, the contents of both of which are incorporated herein by reference in their entirety.

FIELD OF THE INVENTION

This invention relates to an electrical interface. Specifically, the invention proposes a high-voltage electrical interface with improved noise performance.

BACKGROUND OF INVENTION

A conventional solution to noise degradation is to use a differential mode of signaling. In differential signaling, a single data signal is transmitted over two wires (e.g. first and second signal lines), each of which carries one signal component. The two components are generally derived from the same source data signal and are varied such that the data signal is transmitted as the difference between the two signal components. Differential mode signaling improves noise immunity to common mode noise (i.e. noise that occurs on both the first and second signal lines).

In digital environments, differential data signals can be transmitted using two voltage levels of opposite polarity relative to a reference level. For instance, a digital logic level of "high" can be represented by transmitting a positive voltage level, relative to the reference level, on a first signal line and by transmitting a negative voltage level of opposite polarity on a second signal line. While a digital logic level of "low" can be represented by transmitting the reference level on both the first and the second signal lines. The transmitter can then extract the digital data by subtracting the voltage on the second signal line from the voltage on the first signal line. After subtracting the voltages, a received voltage of approximately twice the positive voltage level is registered as a digital logic level high, and a received voltage approximately equal to zero is registered as a digital logic level low. Common mode noise is removed during the subtraction process.

Alternatively, current signaling may be used, in which a differential signal is represented as two current signals flowing in opposite directions on a closed loop. The direction of current flow indicates the polarity of the digital signal transmitted. By changing the relative polarity of the voltage signal components direction of current flow, the desired data may be transmitted.

To provide high voltage isolation and to improve noise immunity to common mode signals, it is known to employ differential signaling with capacitive coupling. Under known differential capacitive coupling techniques, a capacitor is inserted into each of the differential data signal lines, such that the differential transmitter and the differential receiver are separated by a capacitor. The capacitive coupling provides high voltage isolation between the differential transmitter and the differential receiver.

Capacitive coupling, however, has limited success in rejecting high voltage (e.g. 20 volts peak-to-peak) common mode signals. Capacitors capable of withstanding high voltage common mode signals, such as a 0.01 micro-Farad, 3 kilo-volt rated capacitor, are both expensive and bulky. Furthermore, known capacitive coupling techniques are unable to reject high voltage signals over a broad frequency range. Any common mode noise signals over this broad frequency range which are not attenuated will push the transmitted signals into ground or into the chip voltage rail, thereby corrupting the transmitted data.

Accordingly, there exists a need for an improved electrical interface for attenuating common mode signals across a differential signal path.

SUMMARY OF THE INVENTION

This invention improves the attenuation of an undesired signal found in a differential signal path by using inductive, as opposed to capacitive, coupling. The inventive electrical interface includes a primary inductor, a secondary inductor, and a filter. The primary inductor and the secondary inductor operably couple an input differential signal pair to an output differential signal pair, and the filter attenuates an undesired signal in the output differential signal pair.

Other aspects of the invention provide for an input attenuation element coupled to one of the signal paths forming the input differential signal pair. The input attenuation element can act as a high-pass filter. Further features of the invention can also provide for a low-pass filter that attenuates an undesired signal in the output differential signal pair. Additional aspects of the invention also provide for a high-pass filter and a low-pass filter having overlapping cut-off frequencies that thereby provide for improved noise immunity.

Another aspect of the invention includes a parasitic capacitor operably coupled between the primary and the secondary inductor. The parasitic capacitor has a capacitance in the range of approximately 0.5 pF to approximately 2.5 pF.

The invention also includes a method for interfacing an input differential signal pair to an output differential signal pair. In particular, the method includes the steps of inductively coupling the input differential signal pair to an output differential signal pair, and filtering out a common mode signal occurring in the output differential signal pair. The inventive method improves the attenuation of an undesired signal found in a differential signal path by using inductive coupling.

BRIEF DESCRIPTION OF DRAWINGS

The features and advantages of the invention will be apparent from the following description, as illustrated in the accompanying Figures in which like reference characters refer to the same elements throughout the different Figures.

DETAILED DESCRIPTION

Figure 1:
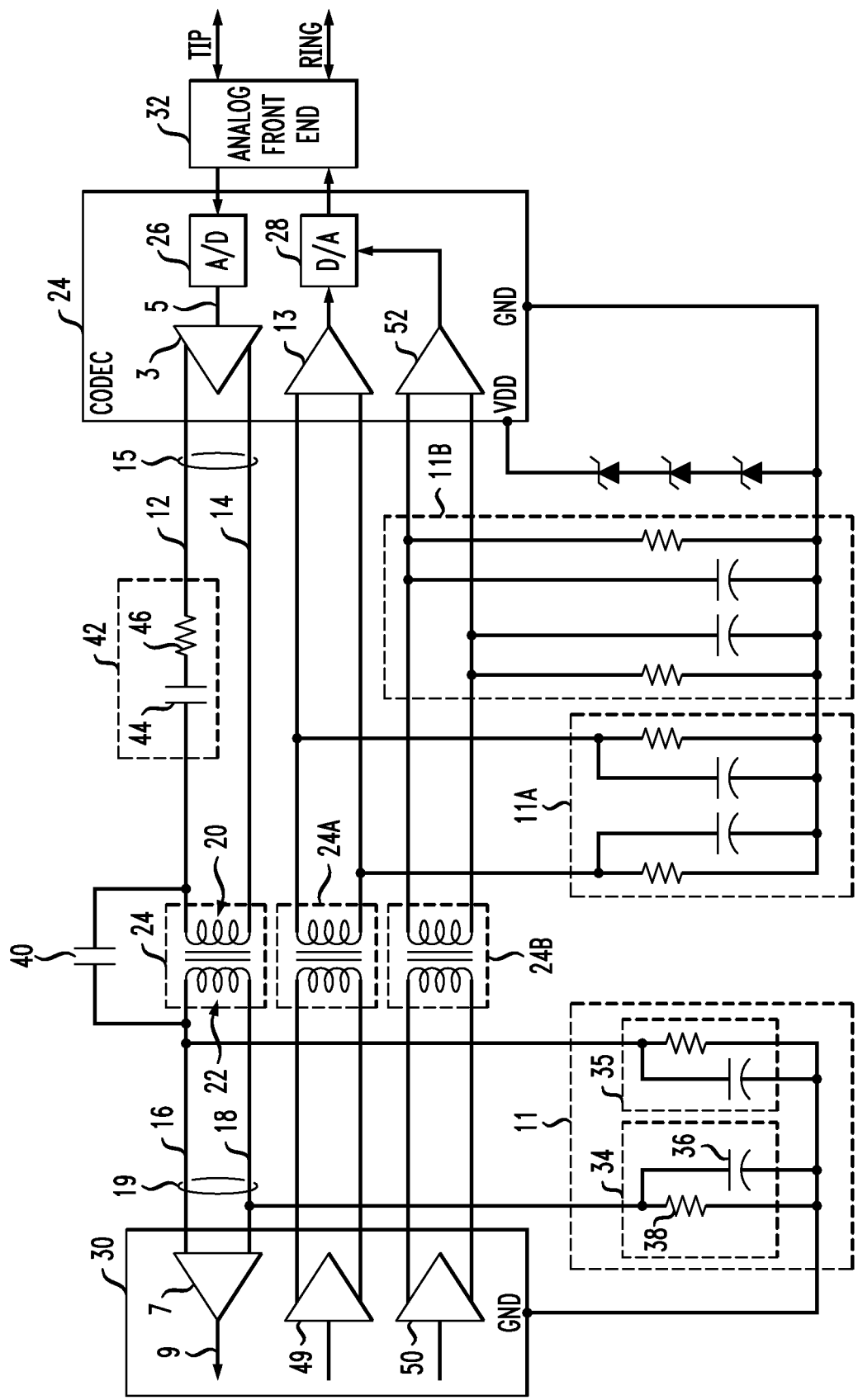
FIG. 1 is a mixed block diagram and schematic diagram of an electrical interface in accordance with the present invention.

FIG. 1 is a mixed block and schematic diagram of an electrical interface 10 in accordance with the present invention. The electrical interface includes a primary inductor 20 and a secondary inductor 22 for operably coupling an input differential signal pair 15 to an output differential signal pair 19. The interface 10 also includes a filter 11 that attenuates a signal occurring in the output differential signal pair 19.

The primary inductor 20 and the secondary inductor 22 inductively couple the input differential signal pair 15 to the output differential signal pair 19. The inductive coupling also electrically isolates a digital circuit 30 from the TIP and RING contacts of the telephone lines. The electrical isolation function of the primary and secondary inductors prevent telephone equipment from applying voltage surges or ground connections to the telephone lines, and vice versa. The filter 11, in accordance with the invention, attenuates common mode noise signals in the output differential signal pair in order to prevent the common mode noise from impacting the digital circuit 30.

The inventors have discovered that common mode noise signals can be injected onto communication equipment from a variety of sources. Two identified source are AM radio signals and electrical devices that do not comply with part 15 of the FCC requirements. The AM radio signals and the non-compliant devices emit noise that is then coupled onto the telephone lines to which various communications equipment is connected. The noise is typically a common mode noise affecting both lines of a differential signal path, such as path 15 of FIG. 1. Large common mode noise signals can saturate a differential receiver by driving the differential signal outside the chip power rails, thereby causing voltage clipping and loss of the transmitted data. The noise can thus cause the communications equipment to fail.

For example, dimmer switches used in lighting typically do not comply with part 15 of the FCC requirements. The dimmer switch chops the 60 Hz AC waveform to regulate the current transferred to the dimmed light. As the dimmer switch chops the waveform with a sharp transient, high frequency energy is generated due to the inductance of the power line. This energy can range from between 10 kHz to 10 MHz and may couple directly onto the TIP and RING lines of a telephone line in proximity to the offending dimmer switch. In addition, the high frequency energy from the dimmer switch can also couple onto the third wire household ground where the high frequency energy can cause noise having an amplitude of 80 volts peak-to-peak. When the communication device receives power from the household power lines, the disturbance on the power lines can propagate through the communication device to the telephone line. The disturbance forms a common mode noise signal of particularly high peak-to-peak amplitudes on the telephone line which can, in turn, cause the communication device to fail. The electrical interface 10, in accordance with the invention, attenuates noise created by these non-compliant devices and thereby prevents the communication equipment from failing. Generally, the interface device 10 keeps the common mode noise within 3 volts, peak-to-peak, for reliable operation.

The capacitive coupling techniques known in the art provides electrical isolation, however, the known(capacitive) coupling techniques fail when subjected to noise generated by electrical devices that do not comply with part 15 of the FCC requirements. The capacitive couplings fail for various reasons. One reason is that the capacitive coupling technique~. do not reject common mode noise over a frequency range broad enough to include the noise generated by electronic devices that do not comply with part 15 of the FCC requirements. In addition, the known capacitive coupling techniques fail to include high-pass and low-pass filters having overlapping cut-off frequencies.

As further shown in FIG. 1, a first input signal path 12 and a second input signal path 14 together form the input differential signal pair 15. A first output signal path 16 and a second output signal path 18 form the output differential signal pair 19. The primary inductor 20 is connected between the first signal path 12 and the second signal path 14. Similarly, the secondary inductor 22 is connected between the first output signal path 16 and the second output signal path 18. A differential driver 3 generates the input differential signal pair 15 from a single line data signal 5. A differential receiver 7 converts the output differential signal pair 19 into a single line data signal 9.

The primary inductor 20 can form the primary winding of a transformer 24, and the secondary inductor 22 can form the secondary winding of the transformer 24. In principle, the transformer 24 consists of two coils electrically insulated from each other and wound on the same iron core. An alternating current in one winding sets up an alternating flux in the core, and the induced electric field produced by this varying flux induces an emf in the other winding. Energy is thus transferred from one winding to another via the core flux and its associated induced electric field. The winding to which the power is supplied is called the primary, and the winding to which the power is delivered is called the secondary. As illustrated in FIG. 1, the primary inductor 20 forms the primary winding of transformer 24, and the secondary inductor 22 forms the secondary winding of transformer 24.

FIG. 1 also illustrates a parasitic capacitor 40 operably coupled between the primary inductor 20 and the secondary inductor 22. The parasitic capacitor can represent a capacitance between the primary inductor 20 and a secondary inductor 22 in the transformer 24.

The parasitic capacitor 40 can have various capacitance values. The inventors have discovered, however, that the capacitance of the capacitor 40 should be minimized in order to prevent common mode noise signals from interfering with the desired data signals being transmitted over the differential signal pair 15. Typically, the capacitor 40 is designed to have a capacitance in the range of approximately 0.5 pF to approximately 2.5 pF.

FIG. 1 illustrates another feature of the invention, wherein the filter 11 includes an attenuation element 34 for operably coupling the signal path 18 of the output differential signal pair 19 to ground. In addition, another attenuation element 35 can be used to operably couple the signal path 16 to ground. The attenuation elements 34 and 35 can each form low-pass filters for signals on their respective signal paths 18, 16. Attenuation element 34 can include a capacitor 36 and a resistor 38 connected in parallel. Similarly, attenuation element 35 can include a capacitor and a resistor connected in parallel.

The resistor-capacitor networks in attenuation elements 34 and 35 each act as low-pass filters. For instance, a high frequency signal on line 18 is shorted to ground through the capacitor 36 in the attenuation element 34 while a low frequency signal is blocked from ground by the attenuation element 34. The attenuation element 34 thus causes high frequency signals on line 18 to be attenuated, and the attenuation element 34 does not attenuate low frequency signals on line 18, thereby acting as a low-pass filter.

FIG. 1 also shows an input attenuation element 42 operably coupled to the input signal path 12. The input signal path 12 forms one of the signal paths of the input differential signal pair 15. The input attenuation element 42 forms a high-pass filter that filters signal passing along signal path 12. In one embodiment of the invention, the input attenuation element 42 includes a capacitor 44 and a resistor 46 connected in series.

Figure 2:
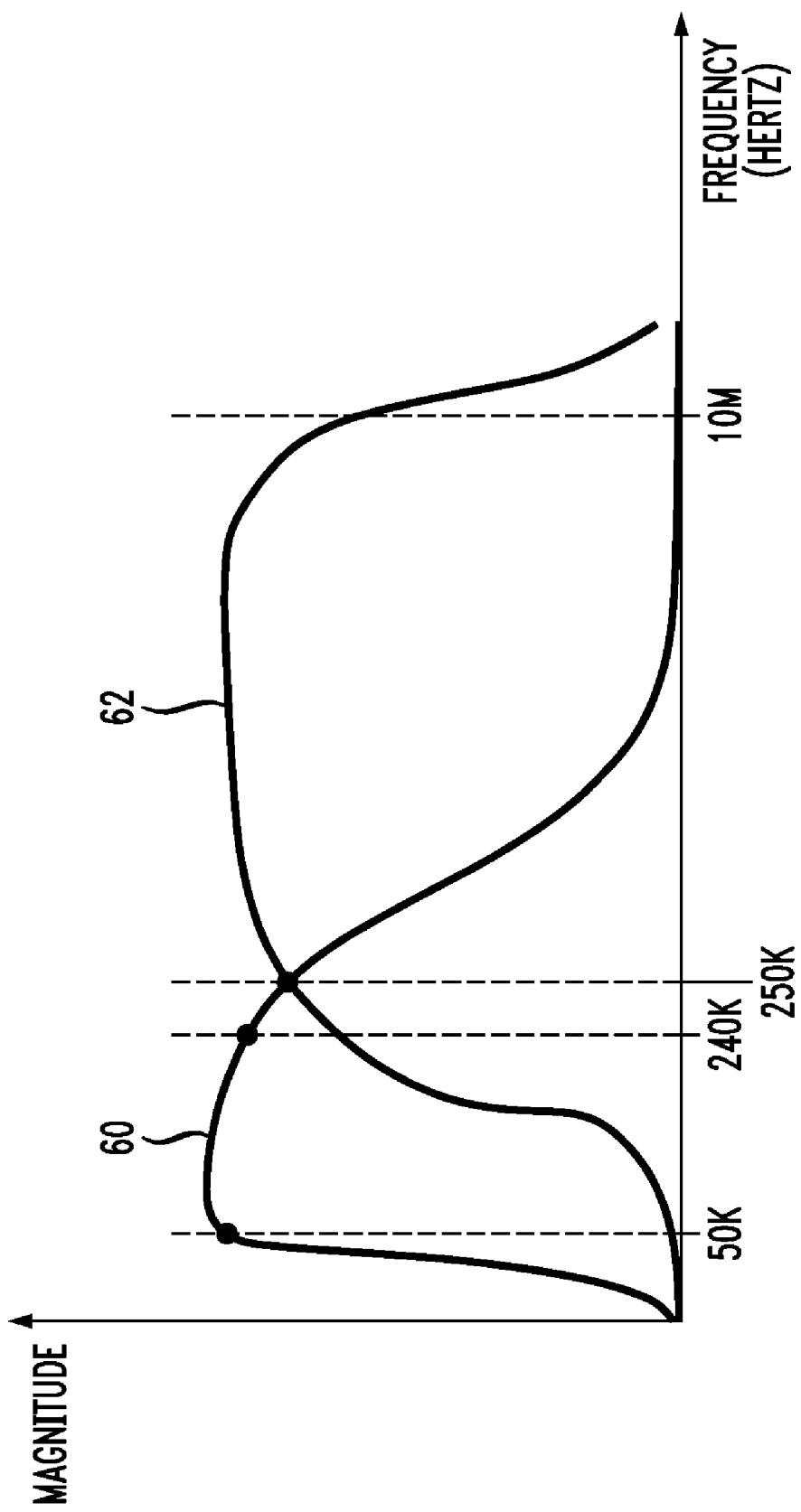
FIG. 2 shows a plot of a frequency verses magnitude response for the electrical interface of FIG. 1.

FIG. 2 shows a plot of a frequency verses magnitude response for the attenuation element 34 and the input attenuation element 42 contained in the electrical interface 10. Curve 60 is an example of the low-pass response for the attenuation element 34 and curve 62 is an example of the high-pass response for the input attenuation element 42.

In accordance with one aspect of the invention, the low-pass filter response of the attenuation element 34 and the high-pass response for the input attenuation element 42 have overlapping cut-off frequencies. Overlapping cut-off frequencies occur when the cutoff frequency of a low-pass filter is at a frequency greater than the cut-off frequency of a high-pass filter. As illustrated in FIG. 2, the low-pass response of curve 60 has a cut-off frequency of 250 kHz, and the high-pass response of curve 62 has a cut-off frequency of 240 kHz. Accordingly, the illustrated curves 60 and 62 have overlapping cut-off frequencies.

As shown by the plot in FIG. 2, the electrical interface 10 can provide for both a low-pass filter and a high-pass filter that together attenuate signals over a frequency range of approximately 50 kHz to approximately 10 MHz. For example, the low-pass response for the attenuation element 34 (i.e. curve 60) can provide high frequency rejection from 250 kHz to 10 MHz, while the high-pass response for the input attenuation element 42 (i.e. curve 62) can provide for low frequency rejection from 50 to 240 kHz. By providing for common mode signal rejection over a broad frequency range (e.g. 50 kHz to 10 MHz), the electrical interface 10 rejects common mode noise that could cause failure of the digital circuit 30.

With further reference to FIG. 1, the electrical interface 10 can operably couple signals between a coder/decoder (hereinafter "codec") 24 and a digital circuit 30. The digital circuit 30 can include a processor, such as a micro-controller or a digital signal processor, executing software instructions. The codec 24 can include an analog to digital converter (hereinafter "A/D") 26 and a digital to analog converter (hereinafter "D/A") 28. The codec 24 is operably coupled between the filter 11 and an analog front end 32. The analog front end 32 interfaces with a telephone line, shown as a TIP and RING signal in FIG. 1.

In operation, the A/D 26 receives an analog signal from the analog front end 32 and converts the signal into a digital signal that is output on signal path 5. The A/D 26 converts the analog input signals into a digital representation suitable for transmission through the primary and secondary inductors 20, 22. 1 bit digital words have been found to be particularly well suited for transmission through the inductors 20, 22. The differential driver 3 converts the digital signal from A/D 26 into the differential signal pair 15. In the transmission direction, the D/A 28 receives a digital signal from a differential receiver 13. The D/A 28 converts the outgoing digital signal into a comparable analog signal that is sent to the analog front end 32.

As further shown in FIG. 1 more than one differential signal path can pass between the codec 24 and the digital circuit 30. For instance, the differential signal path from differential driver 3 to differential receiver 7 can be a path for received data from the telephone line. The differential path from a differential driver 49 to differential receiver 13 can be a path for data transmitted from the digital circuit 30 to the telephone line. In addition, differential path from a differential driver 50 to differential receiver 52 can be a path for a clock signal used in clocking the D/A 28. Each of the differential signal paths can include a transformer and a filter for attenuating common mode noise. In particular, the path from driver 49 to receiver 13 can include a transformer 24A and a filter 11A, while the path from driver 50 to receiver 52 can include a transformer 24B and a filter 11B.

Figure 3:
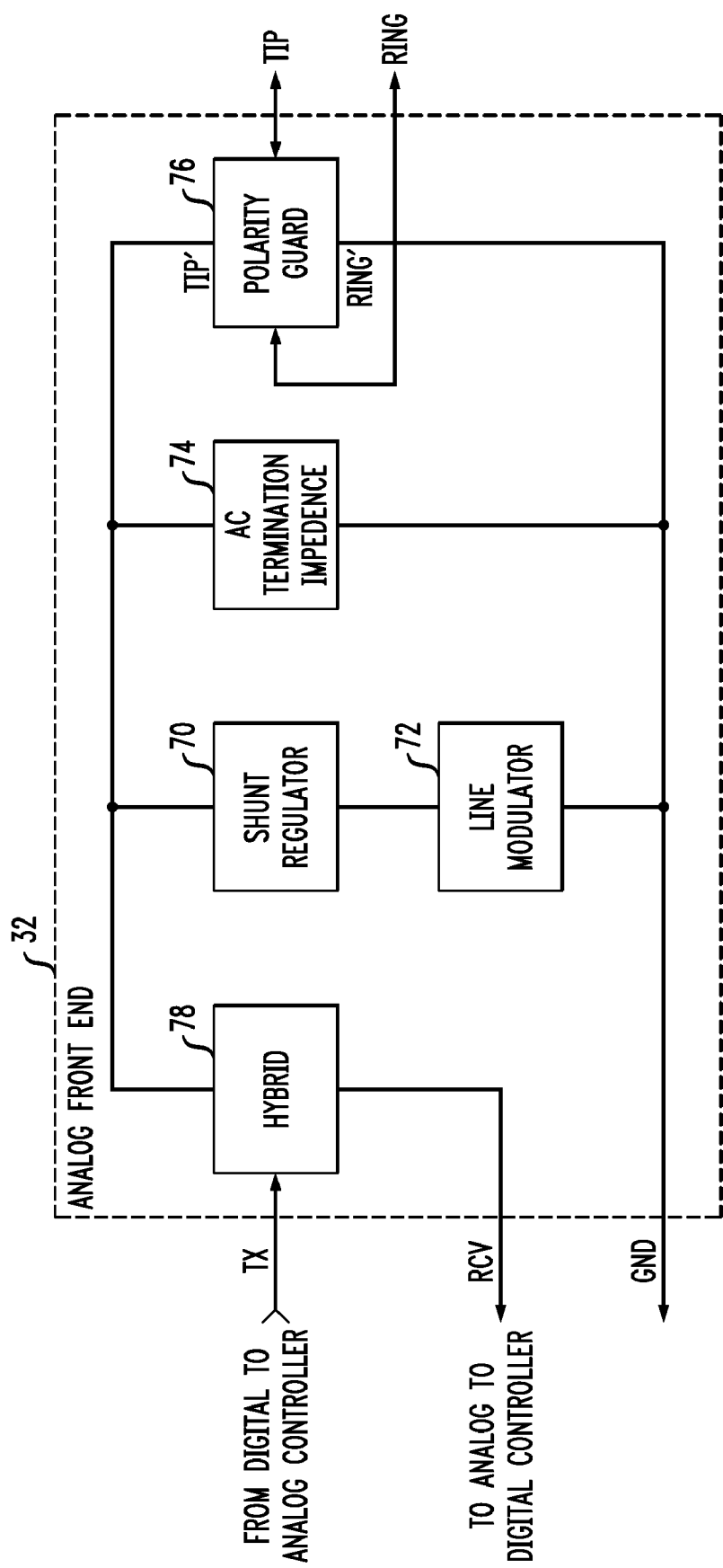
FIG. 3 shows a block diagram of an analog front end of FIG. 1.

FIG. 3 shows a block diagram of the analog front end 32 of FIG. 1. The analog front end 32 can include a shunt regulator 70, a line modulator 72, an AC termination impedance 74, a polarity guard 76 and a hybrid 78. The analog front end provides for an interface between the codec 24 and the TIP and RING connections of the telephone line for transmitting and receiving signals over the telephone line.

The telephone lines to a residence in the United States and elsewhere can have common mode voltages of over 100V, and the FCC requires the telephone lines to be isolated from any electric main powered device (such as a Personal Computer) connected to the telephone lines (through a modem for example) to prevent damage to the telephone network. 47 CFR 68.302,4 (Oct. 1, 1997 Edition). A data access arrangement (DAA) is specified by the FCC to isolate the telephone lines from electric main powered devices. The electrical interface 10 of FIG. 1 used to connect the digital circuit 30 to the TIP and RING lines forms a DAA.

In particular, the AFE 32 can include a hybrid 78 that enables the interface 10 to simultaneously transmit data over and receive data from the telephone line. The hybrid 78 provides for a dual communication channel. In one aspect of the invention, the hybrid samples the TIP' signals and samples the analog signals transmitted from the D/A 28, which represent the outgoing signals. The hybrid can then subtract the sampled outgoing signals from the sampled TIP' signals to generate analog signals that replicated the incoming signals.

The line modulator 72 is used to modulate the telephone line based on the data signal from the D/A 28. For instance, the line modulator 72 can modulate the telephone line return as a function of the signal from the D/A 28.

The AC termination impedance 74 provides the appropriate impedance for phone-line AC requirements. The polarity guard 76 ensures that the correct polarity DC voltage is applied to the AFE circuitry 32. The polarity guard can be implemented using a full-wave rectifier circuit coupled across the TIP and RING terminations.

The shunt regulator 70 provides power draw from the telephone line for powering circuitry, such as the codec 24. The shunt regulator 70 limits the voltage across system components which are in parallel with the shunt regulator 70. Without the shunt regulator, the voltage difference between the voltage at the telephone line and the voltage at the telephone line can range from 5 to 56 volts. With the shunt regulator 70, the voltage to the circuitry can be regulated to a voltage VDDA-VReturn. In general, the shunt regulator 70 acts as a variable resistor to control the voltage seen by the digital circuit 30.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and is not limiting.

We claim:

1. Circuitry adapted to interface between a telephone line and communications equipment, the circuitry comprising:
   an analog front end (AFE) circuit adapted to interface with the telephone line;
   a coder/decoder (codec) connected to the AFE circuit;
   interface circuit connected to the codec, the interface circuit comprising at least a first transformer having a first inductor electromagnetically coupled to a second inductor; and
   a digital circuit connected between the interface circuit and the communications equipment, wherein:

the first inductor of the first transformer is connected to a first differential signal path connected to the codec; and the second inductor of the first transformer is connected to a second differential signal path connected to the digital circuit, such that the first transformer provides electrical isolation between the codec and the digital circuit, wherein the interface circuit further comprises a second filter connected to one of the first and second differential signal paths, wherein the second filter comprises:

a first attenuation element connected to a first signal line of the connected differential signal path; and a second attenuation element connected to a second signal line of the connected differential signal path.

2. The circuitry of claim 1, wherein the first transformer provides parasitic capacitance between the first and second inductors.

3. The circuitry of claim 2, wherein the parasitic capacitance is no more than approximately 2.5 pF.

4. The circuitry of claim 1, wherein the interface circuit further comprises a first filter connected to one of the first and second differential signal paths.

5. The circuitry of claim 4, wherein the first filter is a high-pass filter connected within a first signal line of the first differential signal path.

6. The circuitry of claim 5, wherein the first filter comprises a capacitor in series with a resistor.

7. The circuitry of claim 1, wherein the first and second attenuation elements are low-pass filters.

8. The circuitry of claim 7, wherein each of the first and second attenuation elements comprises a capacitor in parallel with a resistor.

9. The circuitry of claim 1, wherein the interface circuit further comprises a first filter connected to one of the first and second differential signal paths.

10. The circuitry of claim 9, wherein:
the first filter is a high-pass filter;
the second filter is a low-pass filter;
the first, high-pass filter and the second, low-pass filter have overlapping cut-off frequencies.

11. The circuitry of claim 1, wherein the interface circuit further comprises:
a second transformer having two electromagnetically coupled inductors; and
a third transformer having two electromagnetically coupled inductors, wherein:
the first and second differential signal paths provide differential signaling from the codec to the digital circuit;
the second transformer interconnects two differential signal paths providing differential signaling from the digital circuit to the codec; and
the third transformer interconnects two differential signal paths providing a clock signal from the digital circuit to the codec.

12. The circuitry of claim 11, wherein the clock signal is connected to control operations of a digital-to-analog (D/A) converter in the codec that digitizes differential signals provided from the digital circuit to the codec via the second transformer.

13. The circuitry of claim 11, wherein the interface circuit further comprises:
a third filter connected to one of the two differential signal paths interconnected by the second transformer; and
a fourth filter connected to one of the two differential signal paths interconnected by the third transformer.

14. The circuitry of claim 13, wherein each of the second, third, and fourth filters comprises two low-pass filters connected to the two lines of the corresponding differential signal path.

15. The circuitry of claim 1, wherein the interface circuitry provides common-mode noise signal attenuation between the codec and the digital circuit.

16. The circuitry of claim 15, wherein the interface circuitry inhibits common-mode noise signals appearing on the telephone line from reaching the communications equipment.

17. The circuitry of claim 15, wherein the interface circuitry further provides electrical isolation between the codec and the digital circuit.

18. The circuitry of claim 1, wherein:
the interface circuit comprises:
(1) a first, high-pass filter connected to a first signal line of one of the first and second differential signal paths, wherein the first, high-pass filter comprises a capacitor in series with a resistor;
(2) the second, low-pass filter connected to the connected differential signal path, wherein the second, low-pass filter comprises:
the first attenuation element connected to the first signal line of the connected differential signal path; and
the second attenuation element connected to the second signal line of the connected differential signal path, wherein:
each of the first and second attenuation elements comprises a capacitor in parallel with a resistor; and
the first, high-pass filter and the second, low-pass filter have overlapping cut-off frequencies;
(3) a second transformer having two electromagnetically coupled inductors;
(4) a third transformer having two electromagnetically coupled inductors, wherein:
the first and second differential signal paths provide differential signaling from the codec to the digital circuit;
the second transformer interconnects two differential signal paths providing differential signaling from the digital circuit to the codec; and
the third transformer interconnects two differential signal paths providing a clock signal from the digital circuit to the codec, wherein the clock signal is connected to control operations of a digital-to-analog (D/A) converter in the codec that digitizes differential signals provided from the digital circuit to the codec via the second transformer;
(5) a third filter connected to one of the two differential signal paths interconnected by the second transformer; and
(6) a fourth filter connected to one of the two differential signal paths interconnected by the third transformer, wherein each of the third and fourth filters comprises two low-pass filters connected to the two lines of the corresponding differential signal path; and
the interface circuitry provides electrical isolation and common-mode noise signal attenuation between the codec and the digital circuit, such that the interface circuitry inhibits common-mode noise signals appearing on the telephone line from reaching the communications equipment.

19. Circuitry adapted to interface between a telephone line and communications equipment, the circuitry comprising:

an analog front end (AFE) circuit adapted to interface with the telephone line;

a coder/decoder (codec) connected to the AFE circuit;

interface circuit connected to the codec, the interface circuit comprising at least a first transformer having a first inductor electromagnetically coupled to a second inductor; and a digital circuit connected between the interface circuit and the communications equipment, wherein:

the first inductor of the first transformer is connected to a first differential signal path connected to the codec; and the second inductor of the first transformer is connected to a second differential signal path connected to the digital circuit, such that the first transformer provides electrical isolation between the codec and the digital circuit, wherein the interface circuit further comprises:

a second transformer having two electromagnetically coupled inductors; and a third transformer having two electromagnetically coupled inductors, wherein:

the first and second differential signal paths provide differential signaling from the codec to the digital circuit;

the second transformer interconnects two differential signal paths providing differential signaling from the digital circuit to the codec; and the third transformer interconnects two differential signal paths providing a clock signal from the digital circuit to the codec.

20. The circuitry of claim 19, wherein the clock signal is connected to control operations of a digital-to-analog (D/A) converter in the codec that digitizes differential signals provided from the digital circuit to the codec via the second transformer.

21. The circuitry of claim 19, wherein the interface circuit further comprises:

a second filter connected to one of the first and second differential signal paths;

a third filter connected to one of the two differential signal paths interconnected by the second transformer; and a fourth filter connected to one of the two differential signal paths interconnected by the third transformer.

22. The circuitry of claim 21, wherein each of the second, third, and fourth filters comprises two low-pass filters connected to the two lines of the corresponding differential signal path.

\* \* \* \* \*